United States Patent
Hibbs (10) Patent No.: US 11,857,122 B2
(45) Date of Patent: Jan. 2, 2024

(54) MODULAR PORTABLE TOILET WITH ROTARY AGITATOR

(71) Applicant: Coversan, LLC, Savannah, MO (US)

(72) Inventor: Curtis Randall Hibbs, Savannah, MO (US)

(73) Assignee: Coversan, LLC, Savannah, MO (US)

( * ) Notice: Subject to any disclaimer, the term of this patent is extended or adjusted under 35 U.S.C. 154(b) by 7 days.

(21) Appl. No.: 17/352,279

(22) Filed: Jun. 19, 2021

(65) Prior Publication Data

US 2022/0007900 A1 Jan. 13, 2022

Related U.S. Application Data

(60) Provisional application No. 63/048,826, filed on Jul. 7, 2020.

(51) Int. Cl.
*A47K 11/02* (2006.01)
*B01F 31/31* (2022.01)
*B01F 35/511* (2022.01)
*A47K 11/03* (2006.01)
*B01F 101/00* (2022.01)

(52) U.S. Cl.
CPC .............. *A47K 11/02* (2013.01); *B01F 31/31* (2022.01); *B01F 35/511* (2022.01); *A47K 11/03* (2013.01); *B01F 2101/305* (2022.01)

(58) Field of Classification Search
CPC ......... A47K 11/02; A47K 11/03; B01F 31/31; B01F 35/511; B01F 2101/305
See application file for complete search history.

(56) References Cited

U.S. PATENT DOCUMENTS

| 412,273 A | 10/1889 | Kinney |
| 658,982 A | 10/1900 | Fischer |
| 979,386 A | 12/1910 | Druzbach |
| 2,882,534 A | 4/1959 | Jauch et al. |
| 3,023,425 A | 3/1962 | Illo |
| 3,859,672 A | 1/1975 | Modig |
| 5,088,134 A | 2/1992 | Douglas |
| 5,276,924 A | 1/1994 | Hachima |
| 5,307,524 A | 5/1994 | Veal |

(Continued)

FOREIGN PATENT DOCUMENTS

| CN | 101053496 A | 10/2007 |
| DE | 23431 C | 2/1883 |

(Continued)

OTHER PUBLICATIONS

International Search Report for PCT/US16/42931, Toilet Apparatus and Method of Use, dated Oct. 20, 2016.

(Continued)

*Primary Examiner* — Janie M Loeppke
(74) *Attorney, Agent, or Firm* — AVEK IP, LLC; John C. McMahon (57) ABSTRACT

A modular portable toilet apparatus includes a rotary agitator unit having a pair of angled rollers engaging a flexible bowl lined by a replaceable liner bag to mix waste and a reagent therein. The apparatus includes a frame unit and a toilet unit supported by the frame unit. A bowl unit is positioned in the toilet unit along with agitator unit and a power unit including an agitator motor to drive the agitator unit to rotate against the bowl.

11 Claims, 10 Drawing Sheets

(56) References Cited

U.S. PATENT DOCUMENTS

| | | |
|---|---|---|
| 6,138,291 A | 10/2000 | Kot |
| 6,391,453 B1 | 5/2002 | Hansen et al. |
| 6,849,665 B2 | 2/2005 | Frenz et al. |
| 8,973,774 B1 | 3/2015 | Stravitz |
| 9,743,815 B2 | 8/2017 | Hibbs |
| 10,264,932 B2 | 4/2019 | Hibbs |
| 10,674,879 B2 | 6/2020 | Hibbs |
| 10,952,572 B2 | 3/2021 | Hibbs |
| 2006/0280028 A1* | 12/2006 | West .................. B01F 27/213 366/331 |
| 2008/0209623 A1 | 9/2008 | Schaaf |
| 2010/0275363 A1 | 11/2010 | Irizzarry-Lugo |
| 2013/0185866 A1 | 7/2013 | Cheung |
| 2014/0090162 A1 | 4/2014 | Gunn |
| 2015/0164292 A1 | 6/2015 | Shin-Ya |
| 2016/0066895 A1 | 3/2016 | Schwyn et al. |
| 2017/0007082 A1 | 1/2017 | Li |
| 2017/0150853 A1 | 6/2017 | Schaaf |
| 2017/0354300 A1 | 12/2017 | Hibbs |
| 2018/0199770 A1* | 7/2018 | Hibbs ................ B01J 20/28023 |

FOREIGN PATENT DOCUMENTS

| | | | | |
|---|---|---|---|---|
| DE | 3237866 A1 | | 3/1984 | |
| GB | 2468204 A | * | 9/2010 | ........... A47K 11/026 |
| JP | 08275907 A | | 10/1996 | |
| JP | H09234172 A | | 9/1997 | |
| JP | 2003265355 A | | 9/2003 | |
| JP | 2005211085 A | * | 8/2005 | |
| JP | 2007136154 A | | 6/2007 | |
| JP | 2009220106 A | * | 10/2009 | |
| JP | 2009220106 A | | 10/2009 | |
| JP | 2010012077 A | * | 1/2010 | |
| KR | 20150056708 A | | 5/2015 | |
| WO | 2011155849 A1 | | 12/2011 | |

OTHER PUBLICATIONS

International Search Report and Written Opinion for PCT/US2016/042931, Toilet Apparatus and Method of Use, dated Feb. 19, 2019.

* cited by examiner

MODULAR PORTABLE TOILET WITH ROTARY AGITATOR

CROSS-REFERENCE TO RELATED APPLICATIONS

This application claims the benefit of provisional patent application Ser. No. 63/048,826, filed Jul. 7, 2020, the entire contents of both is incorporated herein by reference.

BACKGROUND OF THE INVENTION

Field of the Invention

This invention relates generally to portable toilet devices and, more particularly, to such devices incorporating a rotary mechanism for agitating waste with a reagent material.

Background & Description of the Related Art

Portable toilets of various configurations have been devised for the management of human waste in situations in which permanently installed toilets, such as flush toilets, are not practical. Portable toilets are sometimes employed by individuals or small groups on camping trips, on small boats, by long-distance truckers, at bedside locations in care facilities, and the like. The types of portable toilets used on construction sites and at large gatherings of people include an enclosure with a latchable door for privacy, a holding tank with a liquid treating chemical, and a venting arrangement for venting the enclosure by way of the holding tank. Such structures are referred to generically as transportable enclosed toilets and often referred to as porta-potties. They are of such a size and weight that they are normally transported by trucks and loaded thereon and unloaded therefrom using lift mechanisms. For these reasons, such transportable toilets are not practical for use by individuals or small groups.

Portable toilets typically provide a toilet seat supported above a holding tank which receives and contains the waste along with a chemical or reagent which stabilizes the waste and minimizes odors. The tank must be emptied periodically and the waste and chemical disposed of in a sanitary manner. Many portable toilets are used with removable sanitary liners which reduce contamination of the toilet structures and facilitate removal of waste and chemicals from the holding tank. There are commercially available liner bags for use in portable toilets, along with chemicals or reagents, which may be obtained from stores carrying camping supplies and other sources. Some portable toilets are provided with agitator mechanisms to improve mixture of treating chemicals or reagents with the waste. Portable toilets including agitator mechanisms are disclosed in U.S. Pat. Nos. 9,743,815 and 10,264,932, the disclosures of which are incorporated herein in their entirety by reference.

Existing portable toilets with agitator mechanisms are generally not particularly effective in quickly mixing treating chemicals and waste. Additionally, some are not convenient to disassemble to enable effective cleaning and sanitizing.

SUMMARY OF THE INVENTION

The present invention provides embodiments of a toilet apparatus with improved agitator mechanism components and modularity of the components of the apparatus to facilitate disassembly and reassembly for cleaning purposes.

A portable toilet system according to the present invention includes a flexible waste receiving bowl supported above a lower toilet wall of the system and an agitator mechanism engaging a lower surface of the bowl to mix a reagent with waste in the bowl, the agitator mechanism and further includes: an agitator rotor mounted below a waste receiving bowl of the system to enable rotation of the agitator rotor about a vertical rotor axis thereof; an agitator roller rotatably supported on the agitator rotor and having a roller axis extending radially outwardly from the agitator rotor and angled upwardly relative to the lower toilet wall; an agitator motor engaged with the agitator rotor in such a manner as to cause rotation of the agitator rotor about the rotor axis when activated; and the agitator roller being configured in such a manner so as to engage a lower surface of the bowl whereby rotation of the agitator rotor causes mixing of waste and a reagent in the bowl.

The agitator roller may be a first agitator roller with a second agitator roller substantially similar to the first agitator roller which is supported in diametrically opposed relation to the first agitator roller on the agitator rotor. The system may include an agitator shaft secured to a lower toilet wall of a chemical toilet in vertical alignment below the bowl and has the agitator rotor rotatably mounted thereon. In an embodiment of the system, the agitator motor has a rotary motor shaft extending therefrom which rotates in response to activation of the agitator motor, and an agitator belt is engaged between the agitator motor and the agitator rotor whereby rotation of the motor shaft causes rotation of the agitator rotor. The system may include an agitator rotor retainer removable engaged between the agitator rotor and the agitator rotor shaft to removably retain the agitator rotor and the agitator roller on the agitator rotor shaft.

An embodiment of the system includes a container tub housing of the system and an exhaust fan communicating with the container tub and operable to cause movement of air out of the container tub upon activation of the exhaust fan. The system may include a timer coupled to the exhaust fan and the agitator motor and operable to cause activation of the exhaust fan for a selected delay interval, such as about thirty minutes, before activation of the agitator motor, and an operator switch coupled to the timer and operable to cause activation of the timer. The timer also be configured in such a manner that the exhaust fan and agitator motor continue to stay activated for a selected run interval, such about a half hour.

In an embodiment of the system, the bowl member includes a bowl wall having a bowl shape and terminating upwardly in a mounting rim, the bowl member being formed of a flexible polymer material able to withstand repeated flexure of the wall by contact of an agitator device therewith, and the bowl wall having a Shore durometer in a range of 5 to 80, such a Shore durometer of about 35. The bowl member may be used in combination with a sanitary bowl liner removably positioned within the bowl member for receiving and containing waste therein. The bowl member wall may be a viscoelastic material, such as a rubber material, which could be a natural rubber or a synthetic rubber. The rubber material may be a silicone rubber, a neoprene rubber, or the like.

An embodiment of the toilet apparatus according to the present invention includes removable or separable modular components to facilitate cleaning and maintenance of the apparatus. Such an embodiment includes: a container tub formed by a tub bottom wall with tub side walls upstanding therefrom joined to form an open topped container, the side walls having upper ends, and sets of laterally aligned plate support members extending inwardly from the side walls; a bowl unit removably positioned within the tub, the bowl unit including a bowl plate with a bowl opening formed therethrough and having dimensions such that the bowl plate engages the side walls of the tub and the plate support members, the bowl unit including flexible downwardly convex bowl member secured to the bowl plate in alignment with the bowl opening thereof; an agitator unit removably supported within the tub below the bowl member and including an agitator member positioned to contact the bowl member to enable agitation of contents supported by the bowl member upon movement of the agitator member; a power unit removably secured within the tub and including an agitation motor engaging the agitator member to cause movement of the agitator member upon activation of the agitation motor; and a seat unit removable secured to the upper ends of the side walls of the tub by a hinge member and having a seat opening therethrough which is aligned with the bowl member, the seat member being capable of movement between a closed position with the seat member engaging the upper ends of the side walls and an open position angled away from the closed position.

The modular embodiment of the system may include with a toilet frame structure including: a horizontal tub support frame sized to receive and support the tub therein by engagement with the upper ends of the tub side walls; and a riser, such as a plurality of legs, extending downwardly from the tub support frame and having a length to support the bottom wall of the tub above a floor surface supporting the apparatus. The tub side walls may have a tub flange extending laterally therefrom to facilitate securing the tub to the frame structure. The frame structure may include a pair of laterally spaced armrest supports extending upwardly from the frame, on opposite sides of the tub. The riser or legs of the frame structure may be height adjustable to enable the apparatus to be positioned at a selected height above a floor surface supporting the apparatus.

The agitator unit of the modular embodiment of the system may include: an agitator rotor shaft secured below the bowl member; an agitator rotor rotatably mounted on the agitator shaft and having the agitator member secured thereto and having the agitator motor operatively engaged therewith; the agitator member including a pair of agitator rollers rotatably supported on the agitator rotor in diametric opposed relation, each agitator roller having a respective roller axis extending radially outward from the agitator rotor and angled upwardly toward the bowl member in such a manner as to thereby engage the bowl member; and an agitator rotor retainer removably engaged between the agitator rotor and the agitator rotor shaft to removably retain the agitator rotor and agitator member on the agitator rotor shaft.

The power unit of the modular embodiment of the system may include: an exhaust fan communicating with an interior of the tub through a power unit intake opening of the power unit and with a tub exhaust opening through a power unit exhaust opening; and the exhaust fan urging air within the interior of the tub out of the tub through the tub exhaust opening, upon activation of the exhaust fan. If a sanitary liner is used in the apparatus, activation of the exhaust fan causes the liner to closely line interior surfaces of the tub walls and upper surfaces of the bowl unit.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE PREFERRED EMBODIMENTS

Figure 13:
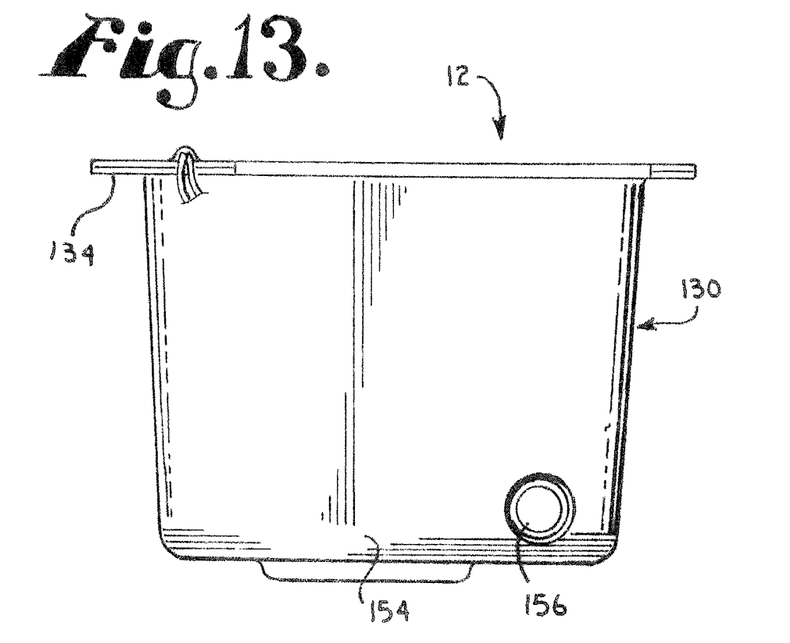
FIG. 13 is a rear elevational view of the power unit and illustrates mounting flanges and an exhaust opening of the power unit.
Figure 14:
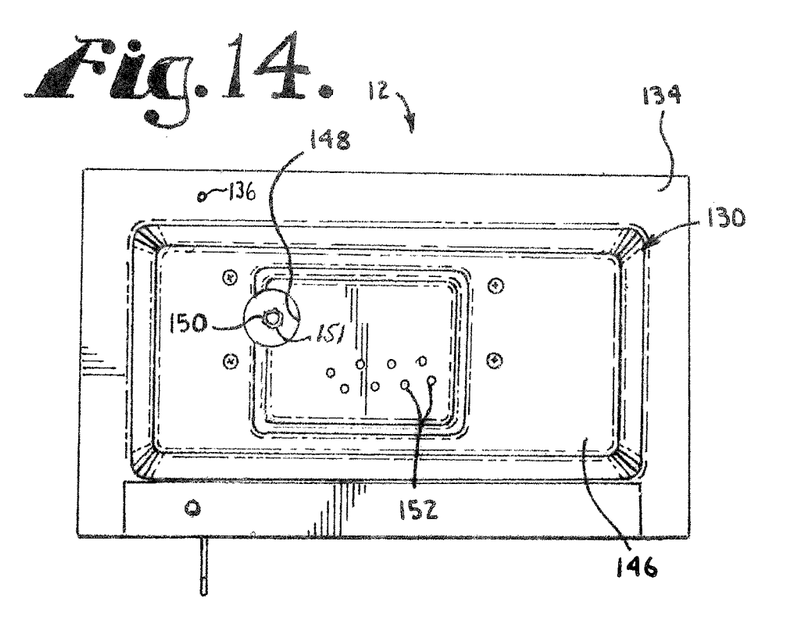
FIG. 14 is a bottom plan view of the power unit illustrating an agitator motor shaft and intake openings for an exhaust fan of the power unit.
Figure 15:
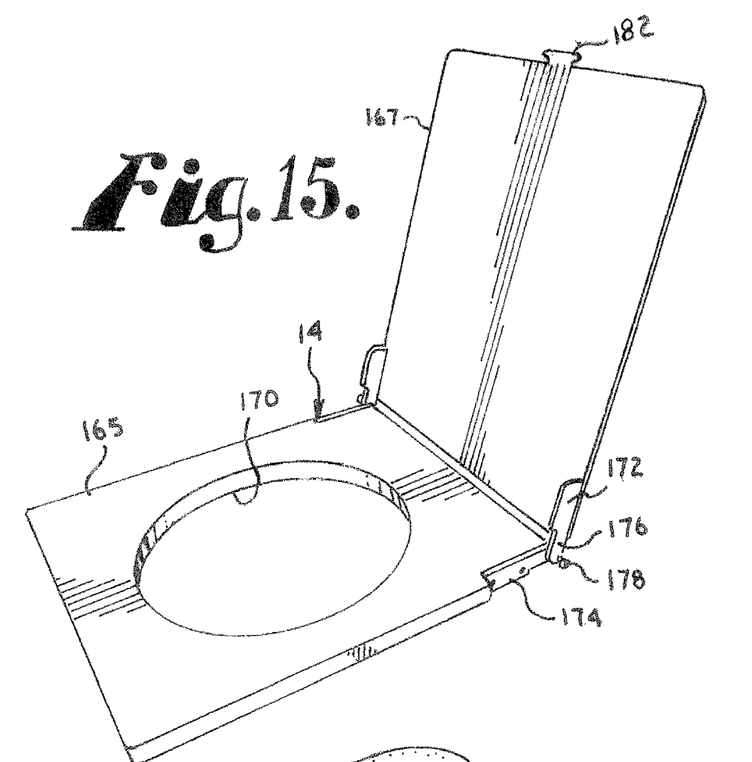
FIG. 15 is a perspective view of a seat unit of the apparatus with cover angled upwardly to illustrate details of a seat unit hinge and including breakaway to show a front bag hook recess in a seat member of the seat unit.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure Referring to the drawings in more detail, the reference number 1 generally designates an embodiment of a modular portable toilet apparatus with a rotary agitator which embodies the present invention. The illustrated apparatus 1 includes a frame unit 4, a toilet unit 6, a bowl unit 8 (FIG. 10), an agitator unit 10 (FIG. 7), a power unit 12 (FIGS. 12-14), and a seat unit 14 (FIG. 15). In general, the bowl unit 8, agitator unit 10, and the power unit 12, are positioned within or supported by the toilet unit 6 which is secured within the frame unit 4 by the seat unit 14.

Figures 1, 2:
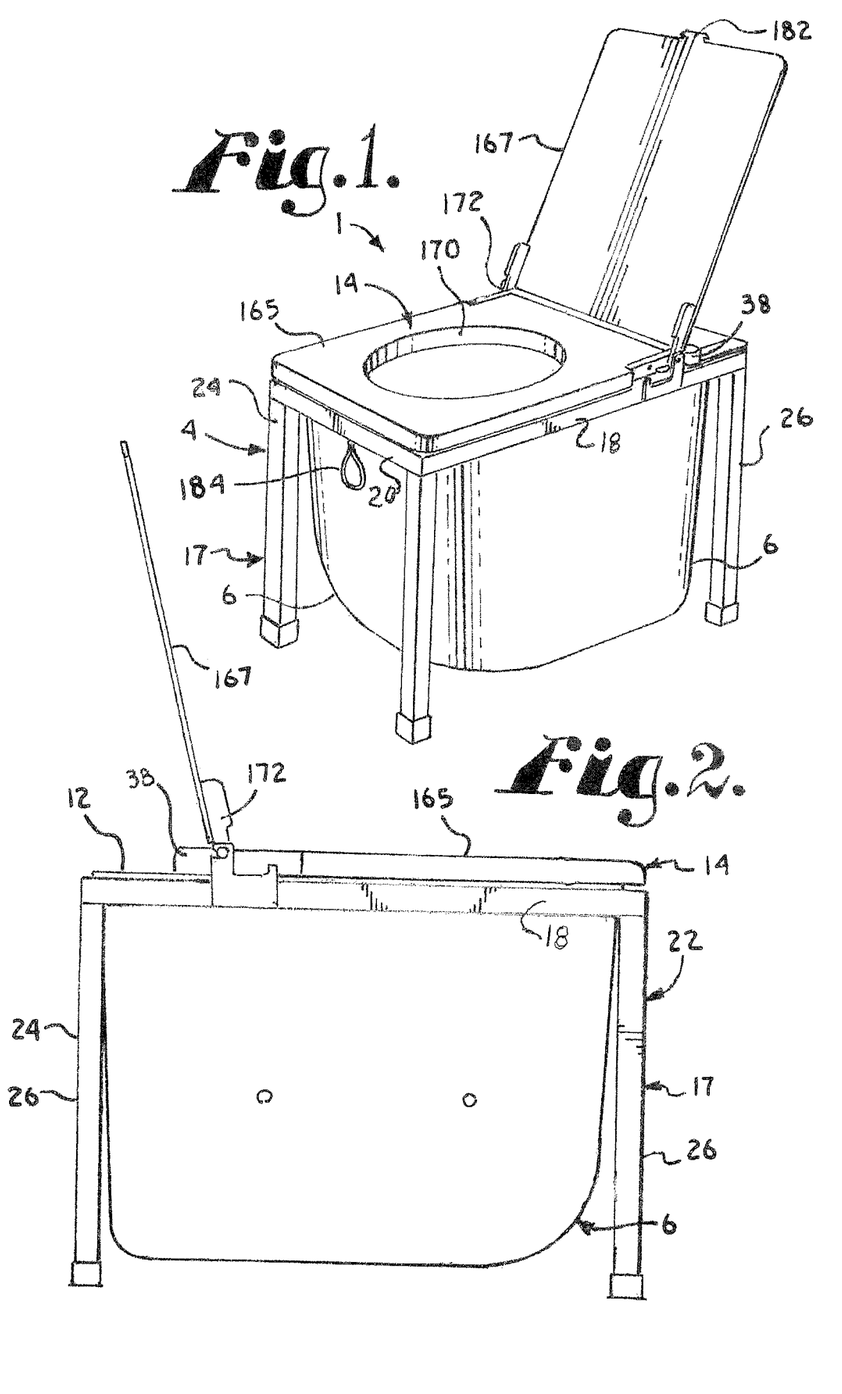
FIG. 1 is a perspective view of a modular portable toilet apparatus embodying the present invention, shown with a toilet unit thereof supported by a compact frame and with a cover open.
FIG. 2 is a side elevational view of the apparatus in the compact frame with the cover open.

Referring to FIGS. 1 and 2, the illustrated frame unit 4 is a compact frame unit 17 and includes left and right hand side rails 18 and front and rear end rails 20 which are joined to form a rectangular upper frame assembly 22 supported by a frame riser 24 including vertically oriented legs 26 joined to the upper frame 22, as at junctions of the side rails 18 and end rails 20. The illustrated frame riser 24 has a length to enable the toilet unit 6 to be supported above a support surface, such as a floor or ground surface, for stability of the apparatus 1. The illustrated rails 18 and 20 and the legs 26 are square tubular metal members, such as of steel; however it is foreseen that other cross sectional shapes and materials could be used for the components of the frame unit 17. It is foreseen that the length of the legs 26 could be adjustable to enable positioning the apparatus 1 at a desired height above a support surface.

Figure 3:
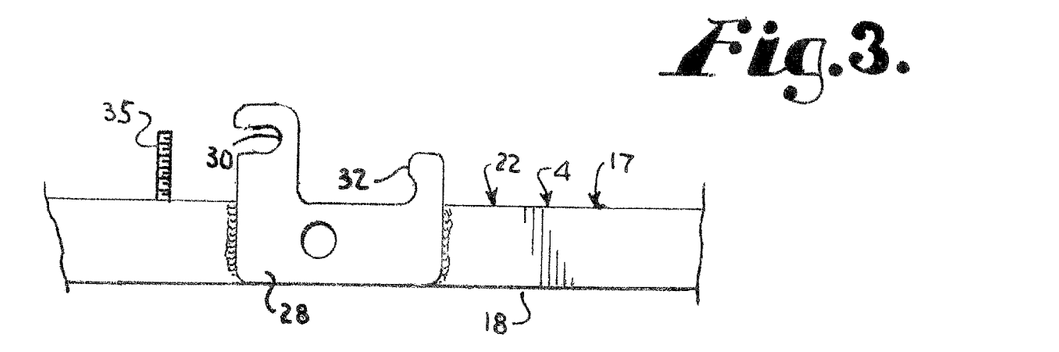
FIG. 3 is an enlarged, fragmentary side elevational view of a side rail of the compact frame and illustrates details of a tub retainer bolt and a seat unit hinge with a rear bag hook.

Referring to FIG. 3, each of the illustrated side rails 18 has a seat unit hinge plate 28 secured to an exterior surface thereof, as by welding. The hinge plate 28 has rearwardly open seat hinge pivot slot 30 at a rear end of the hinge plate 28 and a rear liner bag hook 32 for a purpose which will be described further below. Positioned rearward of the hinge plate 28, a threaded retainer bolt 35 extends upwardly from each side rail 18. The bolts 35 receive threaded retainer nuts 38 (FIGS. 1 and 2) to removably secure the toilet unit 6 within the frame unit 17 by engagement with the power unit 12 and the seat unit 14.

Figure 4:
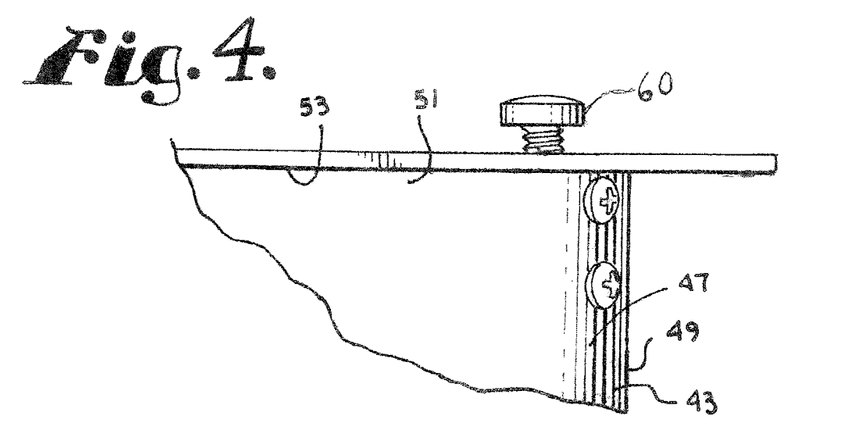
FIG. 4 is a fragmentary side elevational view of a portion of a container tub which supports components of a toilet unit of the apparatus and illustrating a mounting flange of the toilet unit.
Figure 5:
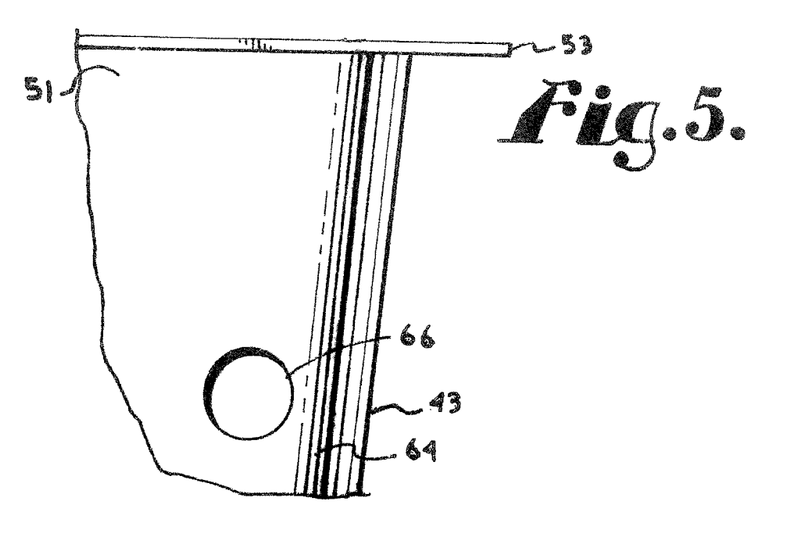
FIG. 5 is a fragmentary end elevational view of a portion of the tub and illustrates tub exhaust opening thereof.

The toilet unit 6 generally includes the bowl unit 8, the agitator unit 10, and the power unit 12 supported within a container tub or housing 43 (FIGS. 4 and 5). The illustrated tub 43 includes a lower wall 45 (FIG. 7), right and left side walls 47, and front and rear walls 49 extending angularly upwardly from the lower wall 45. Upper ends 51 of the walls 47 and 49 have a mounting flange 53 extending outwardly therefrom. The mounting flange 53 engages upper surfaces of the side rails 18 and end rails 20 of frame unit 17 when the toilet unit 6 is secured to the frame unit 17. Side sections of the mounting flange 53 have laterally aligned mounting holes 55 formed therein to receive the retainer bolts 35 therethrough to enable securing the toilet unit 6 to the frame unit 17. The container tub 43 is preferably formed of a fluid impervious material such as a relatively rigid polymer.

Inner surfaces of the side walls 47 have bowl unit support structures 58 extending inwardly therefrom to support the bowl unit 8 when installed within the tub 43. The illustrated bowl unit support structures 58 are bowl unit support bosses. Front bag hook members 60 (FIG. 7) are positioned at the junctions of the side walls 47 with the front end wall 49. The illustrated front bag hooks 60 extend above the surface of the mounting flange 53 and are supported by front hook support blocks 62 secured to inner surfaces of the tub 43. A rear end wall 64 of the tub 43 is provided with a tub exhaust opening 66, for a purpose which will be described below.

Figure 6:
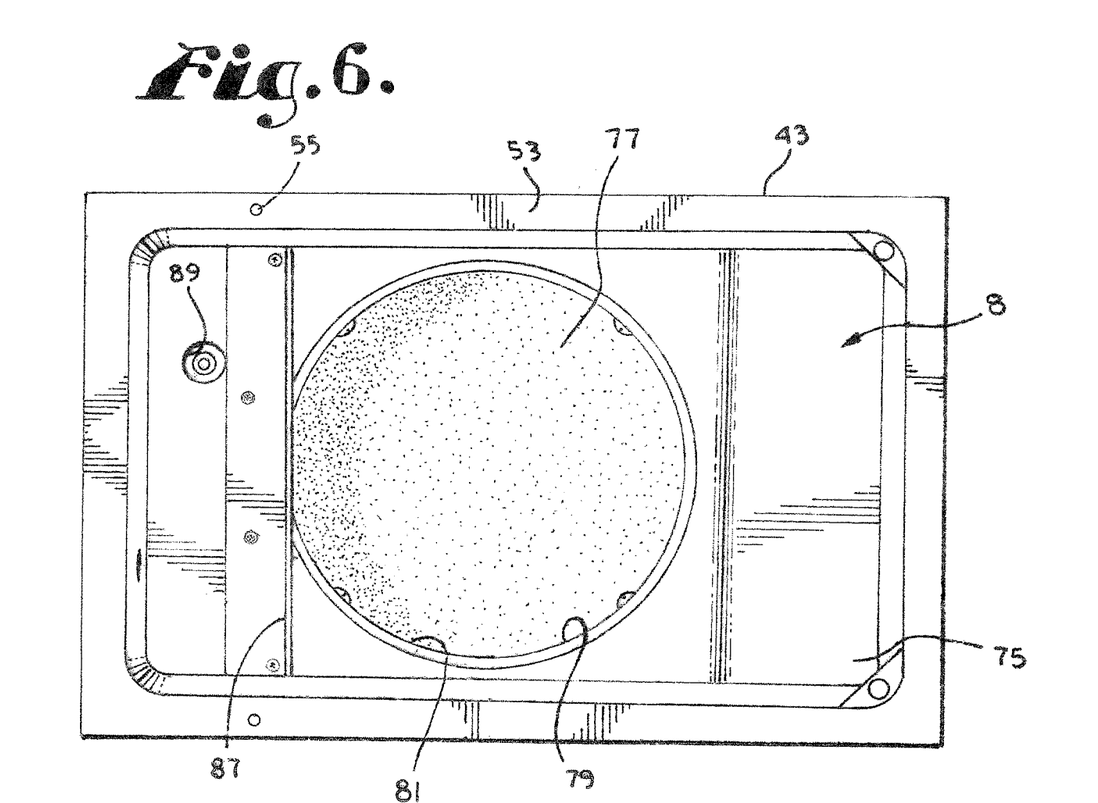
FIG. 6 a top plan view of the toilet unit and illustrates details of a bowl unit of the apparatus and illustrates a partition wall upstanding from a bowl unit wall and an agitator motor shaft opening in the bowl unit wall.
Figure 10:
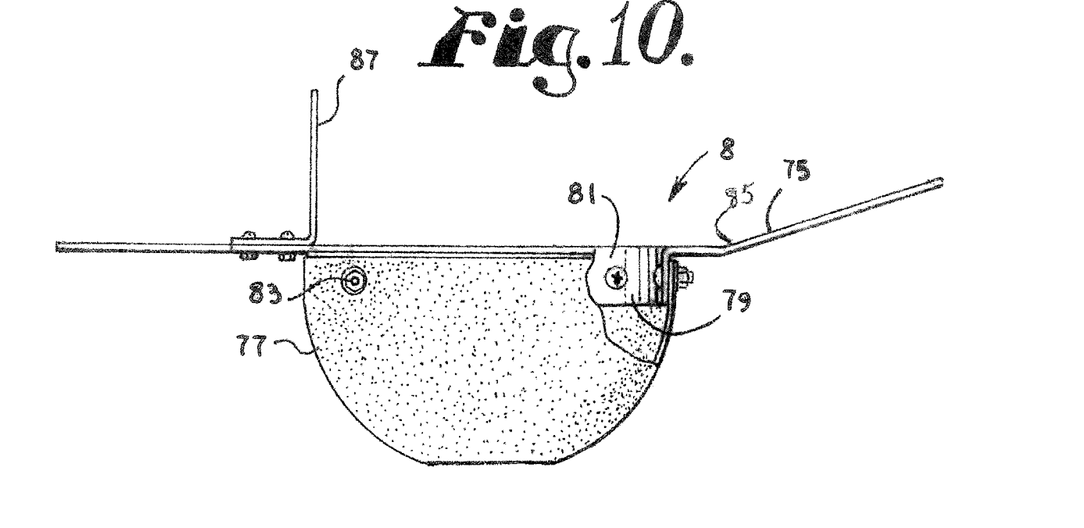
FIG. 10 is a side elevational view of bowl unit of the apparatus.
Figures 11, 12:
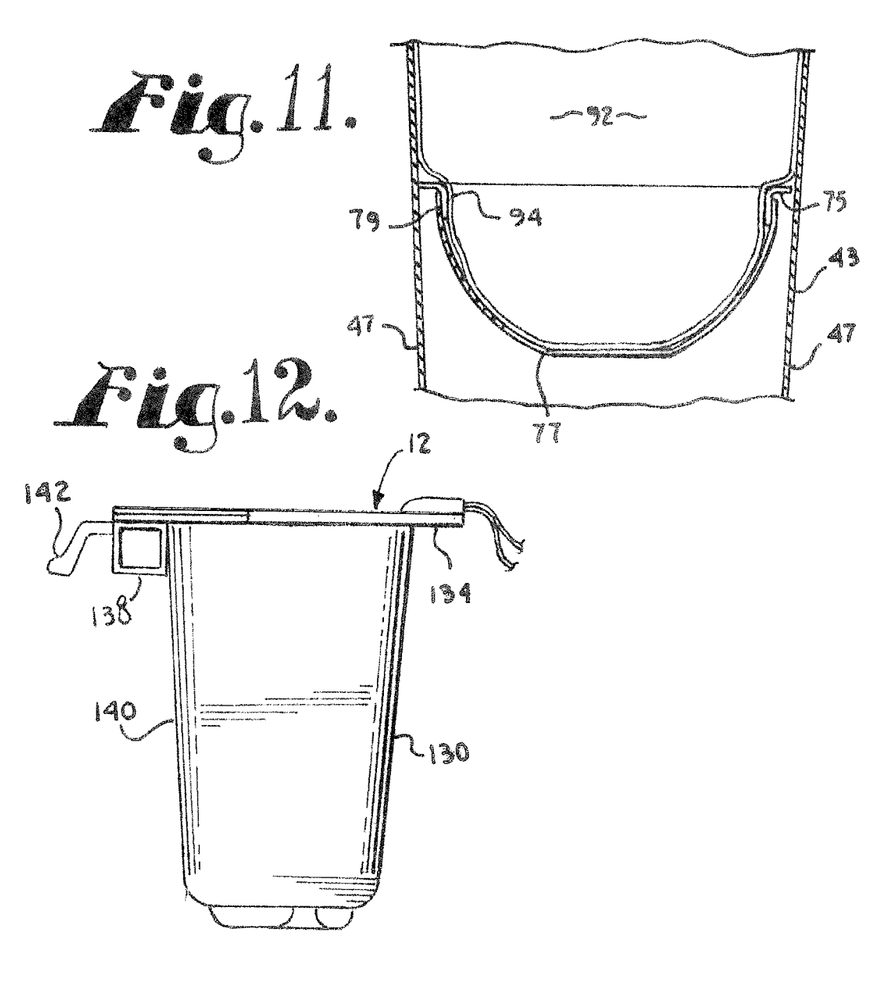
FIG. 11 is a fragmentary lateral cross section of the bowl unit in the container tub with replaceable sanitary bag lining interior surfaces of the tub and the bowl.
FIG. 12 is an enlarged side elevational view of the power unit illustrating a support member of the power unit.

Referring to FIGS. 6, 10, and 11, the illustrated bowl unit 8 includes a bowl support wall or plate 75 having a flexible waste support bowl member or bowl 77 secured thereto. The wall 75 has a depending bowl support collar 79 depending therefrom and defining a bowl opening 81 through the wall 75. The bowl 77 may be secured to an external surface of the collar 79 by fasteners 83, such as bolts and nuts. A front end of the wall 75 has a section 85 (FIG. 10) sloped downwardly toward the bowl unit 8 to facilitate flow of fluids toward the bowl unit 8 from the tub 43. At a rear end of the wall 75, a partition wall or partition 87 extends upwardly from the wall 75. The partition 87 may be an L-shaped member with a lower leg joined to the wall 75. The partition 87 extends the full width of the wall 75. The partition 87 forms a guide for placing a lower part of the power unit 12 in the tub 43. At a rear end of the wall 75, an agitator shaft opening 89 is formed through the wall 75, as will be described below.

The wall 75 is dimensioned such that when the wall 75 is placed within the tub 43 in contact with the support bosses 58, the wall 75 does not form a gas seal with the walls 45 and 47, such that gases are enabled to flow therebetween. The bowl member 77 is dimensioned such that it does not form a gas seal with the collar 79 for a similar purpose. The purpose for these relative dimensions is to enable air to be exhausted from an upper chamber 92 (FIG. 9) of the tub 43. Referring to FIG. 11, the apparatus 1 is preferably used with a disposable sanitary liner bag 94 which covers inner surfaces of the upper chamber 92 of the container tub 43 and upper surfaces of the bowl support wall 75 and the bowl 77. The bag 94 is restrained by the front bag hooks 60 (FIG. 7) and the rear bag hooks 32 (FIG. 3). When air is exhausted from the upper chamber 92 and a lower container tub chamber 96 below the bowl unit wall 75, the liner bag 94 is drawn into close covering relation with the tub surfaces of the upper chamber 92, the bowl support wall 75, and the bowl 77. The liner bag 94 may be of a type which is commercially available for lining portable toilets. The liner bag 94 is placed in the apparatus 1 before use and thereafter removed and disposed of with waste and reagent sealed therein.

The illustrated bowl member 77 has a rounded bowl shape and may be formed of a flexible polymer material able to withstand repeated flexure by contact of components of the agitator unit 10 without cracking, tearing, or otherwise failing. The material forming the bowl 77 is preferably an elastomeric material or a viscoelastic material and may be a rubber material. The rubber material may be a natural rubber or a synthetic rubber, such as a silicone or a neoprene rubber. The material forming the bowl 77 preferably may have a Shore durometer in a range of 5 to 80, and preferably a Shore durometer of about 35.

Figure 7:
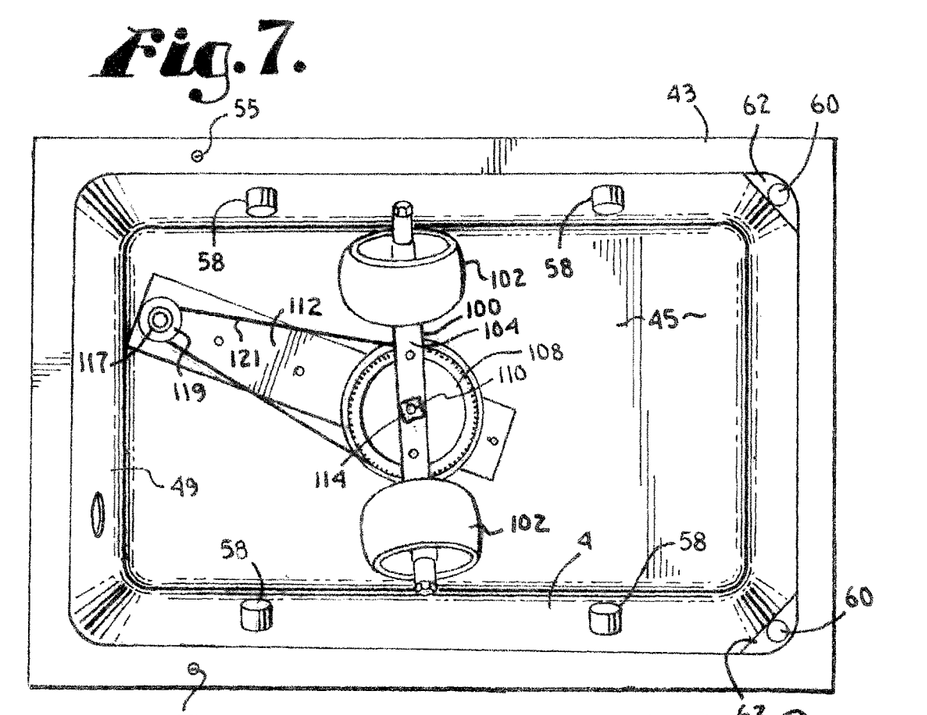
FIG. 7 is a top plan view of the toilet unit with the bowl unit removed and illustrates details of an agitator unit of the apparatus.
Figure 8:
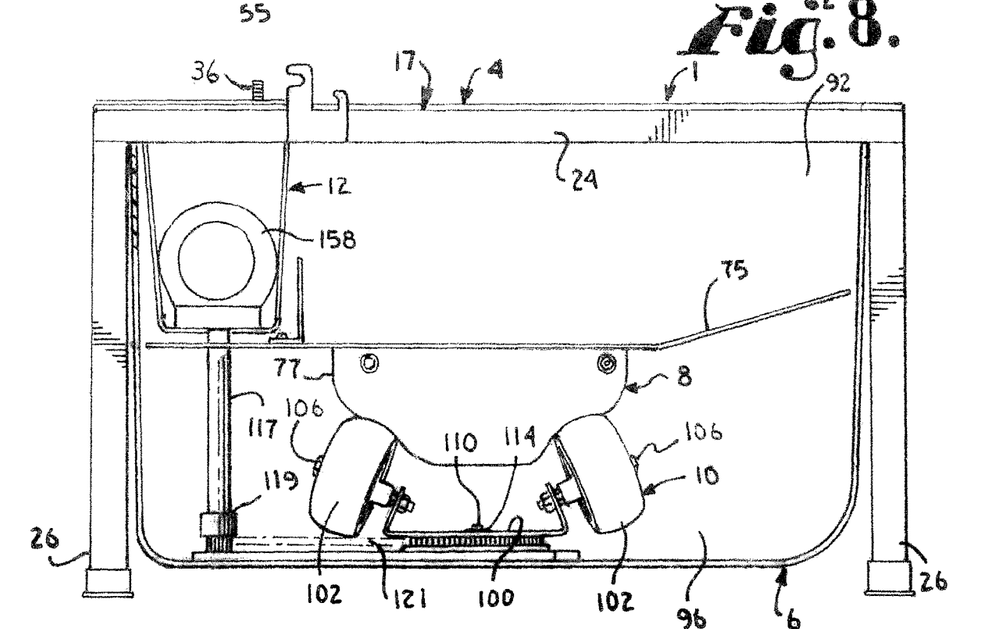
FIG. 8 is a side elevational view of the apparatus with side wall of the container tub removed to illustrate details of the agitator unit and a power unit of the apparatus and engagement of a bowl of the bowl unit by agitator rollers of the agitator unit.
Figure 9:
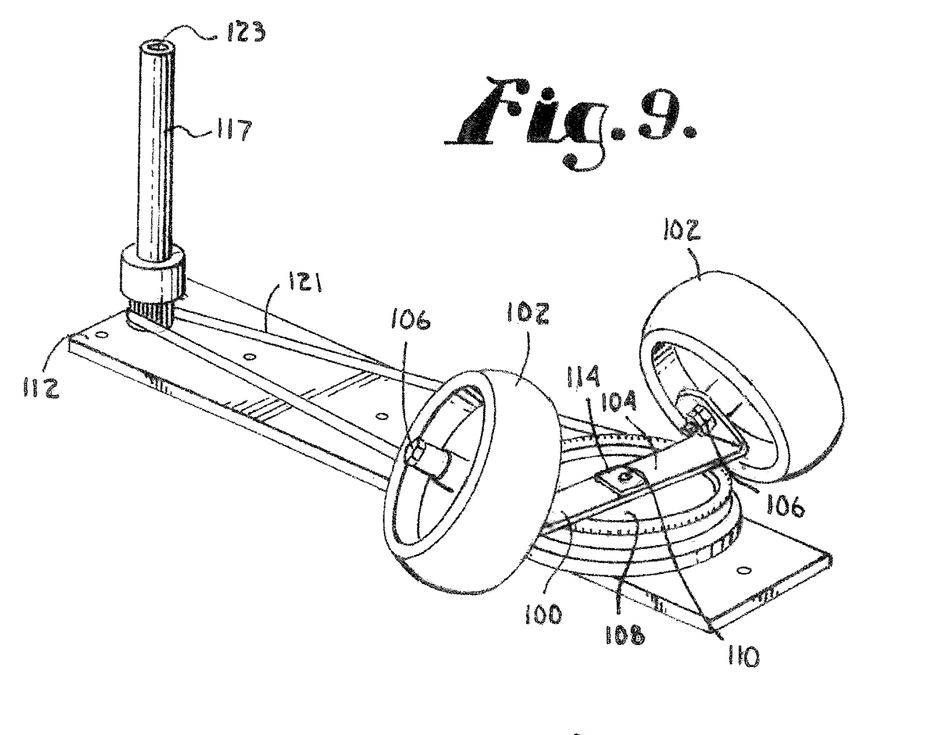
FIG. 9 is an enlarged fragmentary perspective view illustrating details of an agitator drive mechanism of the agitator unit.

Referring to FIGS. 7-9, the illustrated agitator unit 10 includes an agitator rotor 100 supporting a pair of diametrically opposed, angularly inclined agitator rollers 102. The rotor 100 is formed by an agitator bar 104 having roller support shafts 106 extending upwardly and outwardly therefrom. The rollers 102 are rotatably mounted and retained on the shafts 106 and are freely rotatable thereon. The illustrated rotor 100 includes a driven gear 108 having the agitator bar 104 secured thereto. The rotor 100 is rotatably mounted on an upstanding rotor shaft 110 which is supported by an elongated agitator support plate 112 secured to the lower wall 45 of the container tub 43. In the illustrated agitator unit 10, a retainer clip 114 removably retains the rotor 100 on the rotor shaft 110 to enable removal of the rotor 100 and rollers 102 from the toilet unit 6, as for cleaning. As shown in FIG. 7, the support plate 112 is angled from a left rear corner formed by a rear end wall 49 and a left side wall 47 (see FIG. 4) of the container tub 43 and has the rotor shaft 110 along a front to back center line of the tub 43. Such orientation of the rotor shaft 110 positions the agitator rollers 102 to contact a lower surface of the bowl member 77 press it upward a short distance, such as about one inch (about 2.5 cm). When the agitator rotor 100 is rotated, the agitator rollers 102 move contents of the bowl 77 upwardly and in a rotating pattern to mix a reagent and waste in the lined bowl 77. Since the agitator rollers 102 make rolling contact with the lower surface of the bowl 77, minimal friction is generated therebetween.

At an opposite end of the support plate 112 from the agitator shaft 110, an upstanding agitator drive shaft 117 is rotatably supported on the plate 112 in horizontally spaced relation to the rotor shaft 110. A lower end of the drive shaft 117 has a drive gear 119 secured thereto. The drive gear 119 is drivingly engaged with the driven gear 108 on the rotor shaft 110 by an agitator drive belt 121 such that rotation of the drive shaft 117 causes rotation of the rotor 100 and, thus, the agitator rollers 102. The illustrated drive gear 119 and driven gear 108 are toothed, as is an inner surface of the belt 121. It is also foreseen that smooth gears 119 and 108 and a belt 121 with a smooth inner surface could also be employed in the apparatus 1 or that a series of gears could be utilized to rotate between shaft 117 and rollers 102 without a belt like belt 121. An upper end surface of the drive shaft 117 has a non-round drive socket 123 formed therein, as will be described further below.

Referring to FIGS. 12-14 and 16, the power unit 12 includes a closed power unit housing 130 having an agitator motor 132 (FIG. 16) which drives the agitator unit 10 mounted therein. The power unit housing 130 has an upper mounting flange 134 extending outwardly therefrom which overlays the mounting flange 53 of the container tub 43 when installed in the frame 4. Side areas of the flange 134 are provided with laterally aligned mounting holes 136 to receive the mounting bolts 35 therethrough when the power unit 12 is positioned in the frame 4. The illustrated power unit 12 has a square tubular support member 138 extending across an upper end of a front wall 140 of the power unit housing 130. The housing 130 is shaped so that the front wall 140 loosely contacts the bowl unit partition 87 (FIG. 10) when the power unit 12 is positioned in the frame 4. As illustrated in FIG. 12, the power unit 12 may have a container opener hook 142 extending therefrom for use in opening a reagent container assembly 144 (FIG. 20), as will be described further below.

A lower wall 146 of the power unit housing 130 has a motor shaft opening 148 which is aligned with a motor shaft 150 of the agitator motor 132. The power unit 12 is configured so that the motor shaft 150 aligns with the agitator drive shaft 117 of the agitator unit 10 when the power unit 12 is positioned in the frame 4. The motor shaft 150 has a non-round drive projection 151 which is inserted into the non-round drive socket 123 of the agitator drive shaft 117 when the power unit 12 is positioned in the frame 4, whereby the agitator drive 117 is rotated when the agitator motor 132 is activated. The lower wall 146 of the power unit housing 130 is provided with a plurality of exhaust fan intake openings 152. A rear wall 154 (FIG. 13) of the illustrated power unit housing 130 has an exhaust opening 156.

The power unit 12 is provided with an exhaust fan 158 (FIGS. 8 and 16) which is driven by an exhaust fan motor 160. The power unit 12 is configured so that the exhaust fan 158 draws air in through the intake openings 152 and the motor shaft opening 148 and exhausts air through the exhaust opening 156. Drawing air into the intake openings 152 and motor shaft opening 148 draws air from the lower chamber 96 and the upper chamber 92 of the container tub 43, causing the liner bag 94 to be drawn into close contact with the walls of the upper chamber 92 and upper surfaces of the bowl support wall 75 and the bowl 77.

Referring to FIG. 15, the illustrated seat unit 14 of the apparatus 1 includes a toilet seat 165 which is hingedly connected to a cover member or cover 167. The illustrated toilet seat 165 has a toilet seat opening 170 therethrough which is positioned to align with the bowl member 77 of the bowl unit 8. The seat 165 and cover 167 are connected by laterally spaced hinge assemblies 172. Each hinge assembly 172 includes a seat leg 174 and a cover leg 176 which are pivotally connected by a hinge pin 178. The hinge pins 178 are co-linear to form a pivot axis of the seat unit 14. The hinge pins 178 extend laterally outward to enable engagement thereof with the hinge pivot slots 30 of the seat hinge plates 28 of the frame unit 4. The seat unit 14 is positioned in the upper frame assembly 22 of the frame unit 4 upon the mounting flange 53 of the container tub 43 and is retained in place by the retainer nuts 38 received on the retainer bolts 35.

When the seat unit 14 is secured to the frame unit 4, both the cover 167 and the seat 165 may be pivoted to an obtuse angle by contact with the retainer nuts 38. This position enables a liner bag 94 in the upper chamber 92 by hooking the bag to the rear bag hooks 32 and the front bag hooks 60. The seat 165 can then be pivoted to use position in contact with the mounting flange 53 of the container tub 43. An under side surface of the seat 165 is provided with front hook recesses (not shown) aligned with the front bag hooks 60. The seat unit 14 may be closed by pivoting the cover 167 into covering relation with the seat 165. The cover 167 may be provided with a retainer receiver 182 for cooperation with a resilient loop 184 (FIG. 1).

Figure 20:
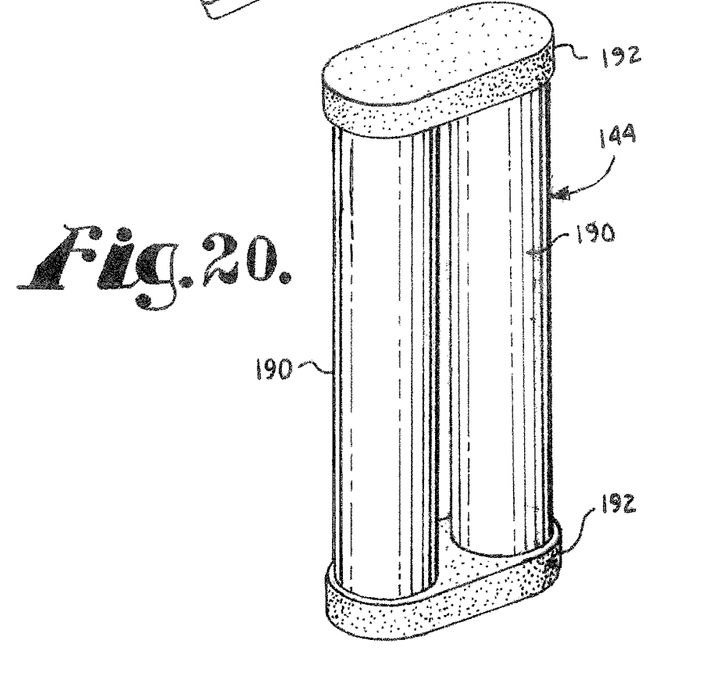
FIG. 20 is a greatly enlarged perspective view of a container structure for a two-part reagent used in the apparatus.

FIG. 20 illustrates a reagent container assembly or container 144 which contains a reagent or components of a reagent for treating waste in the lined bowl 77 of the apparatus 1. The illustrated container 144 includes a pair of elongated tubular container members or tubes 190 having end stoppers 192 which releasably seal ends of the tubes 190. The stoppers 192 position the tubes 190 is substantially parallel relation. The tubes 190 may contain two components of the treating reagent which, when mixed, form an effective treatment for the waste. The tubes 190 may contain a granular soap and an oxidizer which are mixed to form the reagent. The stoppers 192 are configured for use with the opener hook 142 (FIG. 12) on the power unit 12 to remove one of the stoppers. The container 144 may be positioned to engage a stopper 192 with the hook 142 and pulled to release the materials in both the tubes 190 into the lined bowl 77. Components of the container 144 are preferably formed of biodegradable materials, such that the empty tubes 192 and remaining stopper 192 may be simply dropped into the lined bowl 77.

Figures 18, 19:
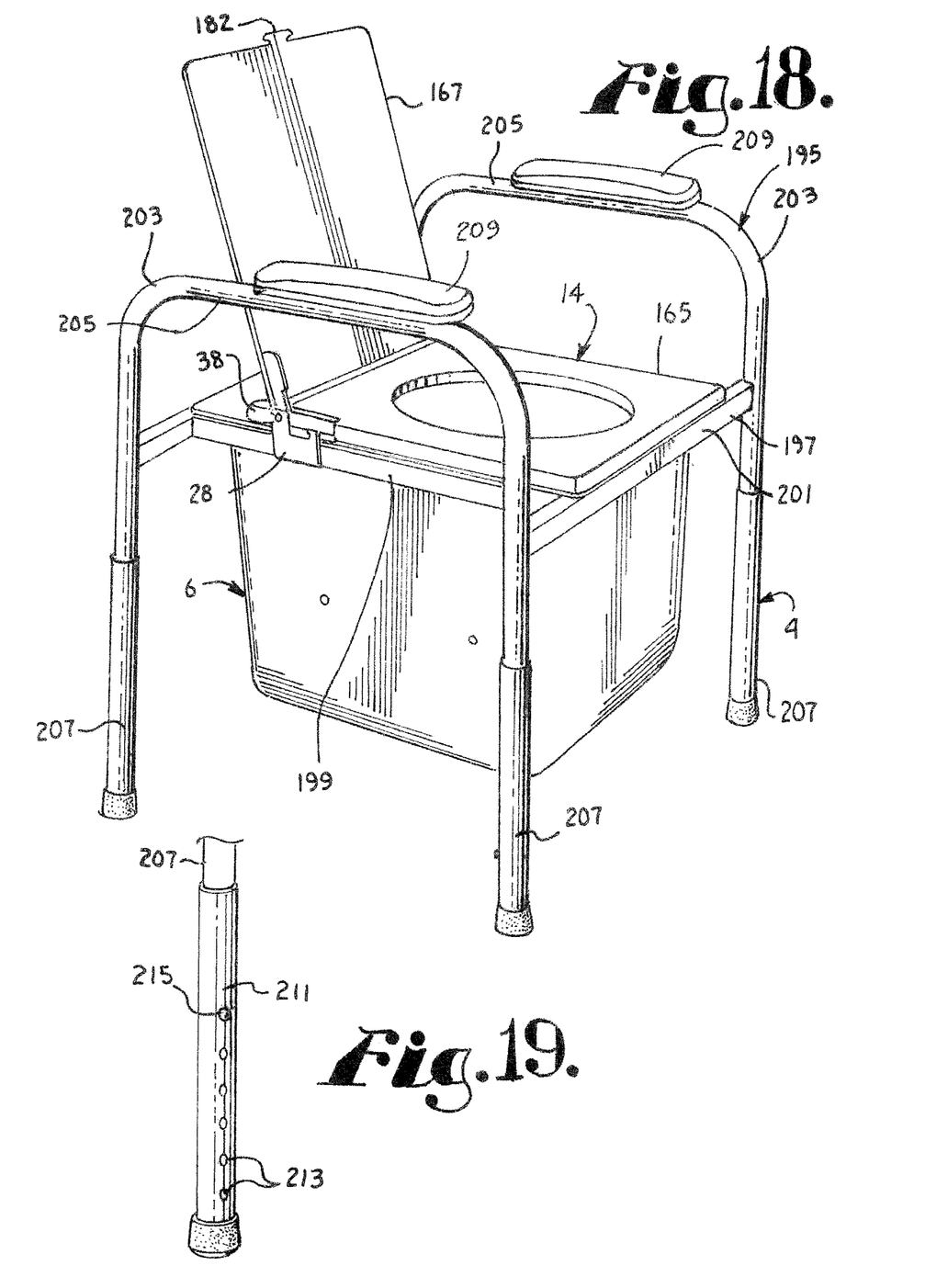
FIG. 18 is a perspective view illustrating a modified embodiment of the apparatus with the toilet unit supported by a bedside toilet frame.
FIG. 19 is an enlarged fragmentary perspective view of a leg of the bedside toilet frame and illustrates components for adjusting the length of legs of the bedside toilet frame.

FIGS. 18 and 19 illustrate a modified embodiment 195 of the frame unit 4 of the apparatus 1. The frame unit 195 is referred to as a bedside frame and is made to accommodate the needs of a person with limited mobility at home, a care facility, or the like. The illustrated bedside frame unit 195 includes an upper support frame 197 including laterally spaced side rails 199 and front and back end rails 201 which are joined to form the upper frame 197. Ends of the end rails 201 extend past the side rails 199 to form a wider upper frame 197 than the upper frame 22. The upper frame 197 is supported above a floor by a pair of frame risers 203 joined to opposite ends of the end rails 201. Each frame riser 203 is an inverted U-shaped member and includes an upper arm rest support 205 with a pair of legs 207 depending therefrom. The arm rest supports 205 may have cushioned arm rest pads 209 secured thereto. The illustrated risers 203 are formed of circular cross section tubular members with transitions between the arm rest supports 205 and the legs 207 being rounded.

The side rails 199 and end rails 201 are spaced apart the same distances as the corresponding side rails 18 and end rails 20 of the compact frame unit 17. Additionally, the side rails 199 are provided with the retainer bolts 35 and seat hinge plates 28 in locations corresponding to their locations on the side rails 18 of the compact frame unit 17. Thus, the toilet unit 6 can be received and supported in the bedside frame unit 195 and retained by installation of the seat unit 14 with the retainer nuts 38. The lengths of the legs 207 may be adjustable to place the toilet unit 6 at a comfortable height for the user. As shown in FIG. 19, lower end sections 211 of the illustrated legs 207 telescope onto the legs 207. Each leg lower section 211 is provided with a series of vertically spaced holes 213 which can be engaged by a retainer pin 215 resiliently urged outward. The pin 215 may be pressed inwardly as the lower section 211 is telescoped along the leg 207 to a selected leg length.

Figure 16:
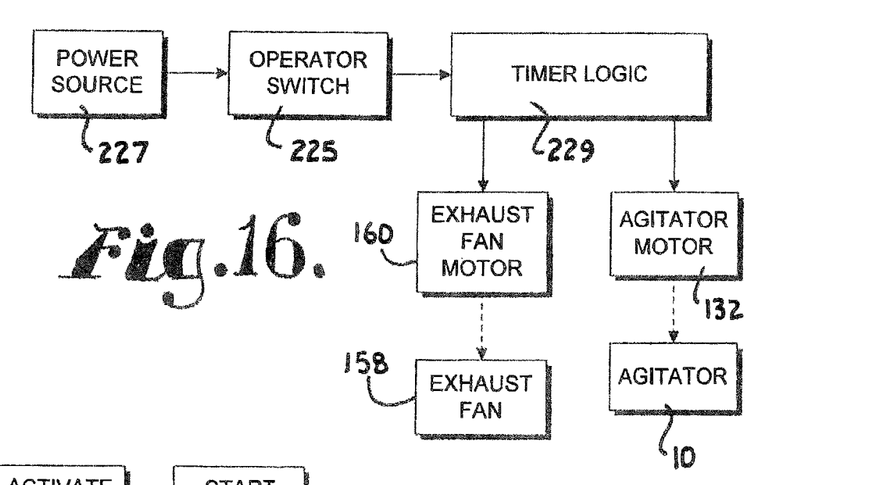
FIG. 16 is a block diagram illustrating control components of the power unit for controlling operation of the exhaust fan and an agitator motor of the power unit.

Referring to FIG. 16, the power unit 12 includes the agitator motor 132, the exhaust fan motor 160, and the exhaust fan 158. The power unit 12 also includes an operator switch 225 to activate the motors 132 and 160 by connecting them to a power source 227. The power source 227 is preferably a direct current (DC) power source at a selected voltage, such as 12 volts for typical use or 24 volts for use in many semi-trailer tractors. The source may be a rechargeable battery or a power supply which converts alternating current (AC) line voltage into direct current. It is foreseen that the motors 132 and 160 could simply be operated simultaneously by operation of the operator switch 225. However, in the apparatus 1, the motors 132 and 160 may be controlled by timer logic circuitry or timer logic 229 to be activated at different running times.

Figure 17:
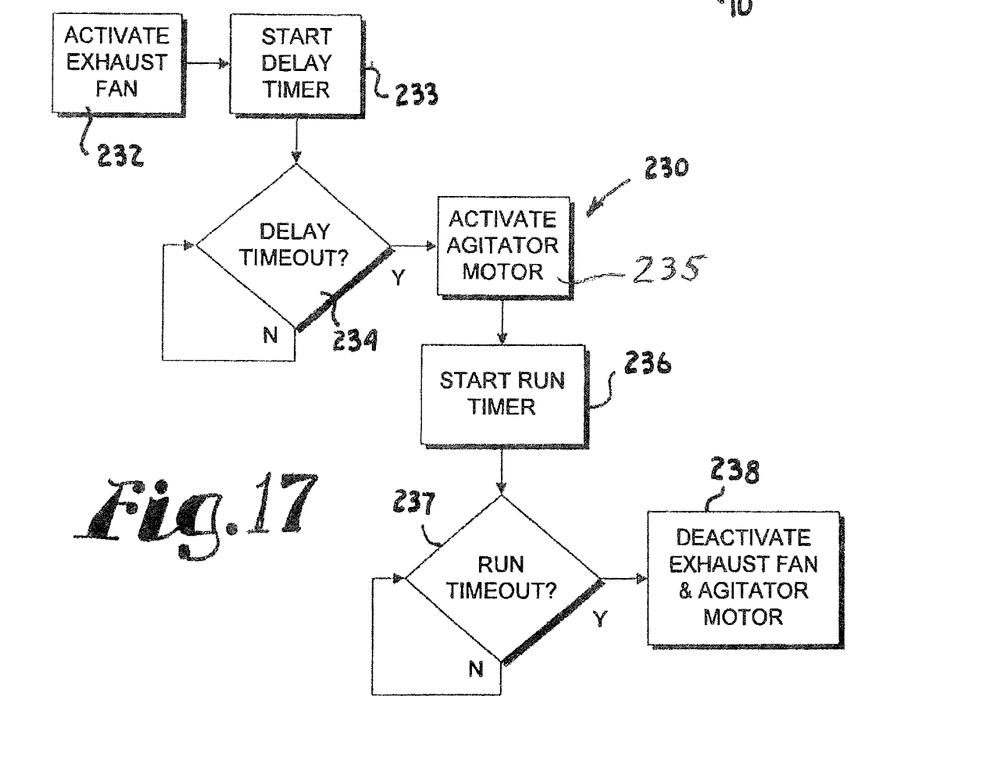
FIG. 17 is a flow diagram illustrating a timer logic program for timed operation of the exhaust fan and the agitator motor.

Referring to FIG. 17, the timer logic 229 causes the exhaust fan motor 160 to be activated at step 232 of a timer logic program 230, when the operator switch 225 is actuated, causing a delay timer to be started at step 233. The delay may, for example, be about 30 seconds. When the delay timer times out at step 234, the agitator motor 132 is activated at step 235, causing a run timer to be started at step 236. The run time may, for example, be about 30 minutes. The exhaust fan motor 160 continues to run. When the run timer times out at step 237, the exhaust fan motor 160 and the agitator motor 132 are deactivated at step 238. The timer logic 229 could be programmed in such a manner that actuating the operator switch 235 during the process could cause the logic 229 to advance directly to step 238 to deactivate the motors 160 and 132.

In use of the apparatus 1, the cover 167 and seat 165 are folded up, and liner bag 94 opened into the upper chamber 92 of the container tub 43 and hooked onto the rear bag hooks 32 and the front bag hooks 60. The operator switch 225 is actuated to cause activation of the exhaust fan 158, causing the bag 94 to be drawn into contact with the walls of the upper chamber 92 and upper surfaces of the bowl unit 8 and the bowl 77. After a delay interval as controlled by the timer logic 229, the agitator motor 132 is activated, causing the agitator rollers 102 to rotate in contact with the lower surface of the bowl 77, without tangling the portion of the bag 94 within the bowl 77. When the agitator motor 132 has been activated, the reagent container assembly 144 may be opened by drawing one of the stoppers 192 against the opener hook 142 to cause the reagent in the tubes 190 to pour into the lined bowl 77. The seat 165 may then be folded down into contact with the mounting flange 53 of the container tub 43 for use of the apparatus 1. Thereafter, the cover 167 may be folded over the seat 165 while the agitator unit 10 continues to mix contents of the lined bowl 77 until the timer logic 229 causes deactivation of the exhaust fan 158 and the agitator motor 132. Later, the liner bag 94 can be removed, sealed, and disposed of in a sanitary manner.

It is to be understood that while certain forms of the present invention have been illustrated and described herein, it is not to be limited to the specific forms or arrangement of parts described and shown.

What is claimed as new and desired to be secured by Letters Patent is:

1. A portable toilet system including a flexible waste receiving bowl supported within the toilet system and an agitator mechanism engaging a lower surface of the bowl to mix a reagent with waste in the bowl, the agitator mechanism comprising:
   (a) an agitator rotor mounted relative to a waste receiving bowl of the system to enable rotation of the agitator rotor about a vertical rotor axis thereof;
   (b) an agitator bar secured to and being rotatable by the agitator rotor; first and second agitator rollers each pivotally attached near diametrically opposed ends of the agitator bar to the agitation bar; the first and second rollers rotating about a central axis and engaging a lower and outer surface of the bowl, each agitator roller axis extending outwardly and upwardly from the agitator bar; the agitator rollers being spaced from one another so as to simultaneously contact and depress the bowl whereat the rollers engage the bowl so as to compress the contents of the bowl together; the bowl being constructed of elastic material with memory such that after depression of the bowl by the roller at a particular location during rotation, the bowl returns to a shape the bowl has prior to depression by the rollers; the rollers cooperating to swirl the contents of the bowl;
   (c) an agitator motor engaged with the agitator rotor in such a manner as to cause rotation of the agitator rotor about the rotor axis when activated.

2. The system as set forth in claim 1 wherein the:
   (a) the rollers are each mounted on respective shafts that are aligned upwardly and outwardly such that the rollers contact the bowl at an angle with respect to vertical of approximately 45°.

3. A system as set forth in claim 1 and including:
   (a) an agitator shaft secured within the toilet system in vertical alignment below the bowl and has the agitator rotor rotatably mounted thereon.

4. A portable toilet system including a flexible waste receiving bowl with memory to return to an original shape thereof after being flexed and supported above a lower toilet wall of the system and an agitator mechanism engaging a lower and outer surface of the bowl to mix a reagent with waste in the bowl, the agitator mechanism comprising:
- (a) an agitator rotor shaft secured to a lower toilet wall of a chemical toilet in vertical alignment below the waste receiving bowl of the toilet system;
- (b) an agitator rotor mounted on the shaft to enable rotation of the agitator rotor about a rotor axis thereof;
- (c) an agitator bar attached to an upper end of the agitator rotor and rotating with the agitator rotor; the agitator bar having diametrically opposed first and second ends;
- (d) first and second agitator rollers rotatably joined to respective first and second ends of the agitator bar by roller shafts so as to allow rotation of the rollers such that each roller rotates about a central axis thereof; each first and second roller shaft having a central shaft axis that is coaxial with a respective roller axis; each shaft axis extending radially outwardly and upwardly from the agitator bar;
- (e) an agitator motor engaged with the agitator rotor in such a manner as to cause rotation of the agitator rotor about the rotor axis; and
- (f) the agitator rollers being spaced from each other on the agitator bar less than the width of the bowl so as to be configured in such a manner as to engage and depress the lower and outer surface of the bowl in opposition to each other and so as to flex the bowl inward whereby rotation of the agitator rotor causes mixing and swirling of waste and a reagent in the bowl.

5. A system as set forth in claim 4 wherein:
- (a) the agitator motor has a rotary motor shaft extending therefrom which rotates in response to activation of the agitator motor; and
- (b) an agitator belt is engaged between the agitator motor and the agitator rotor whereby rotation of the motor shaft causes rotation of the agitator rotor.

6. A system as set forth in claim 4 and including:
- (a) an agitator rotor retainer removable engaged between the agitator rotor and the agitator rotor shaft to removably retain the agitator rotor and the agitator roller on the agitator rotor shaft.

7. A portable toilet system including a flexible waste receiving bowl with memory supported above a lower toilet wall of a container tub of the system and an agitator mechanism engaging a lower and outer surface of the bowl to rotate and mix a reagent with waste in the bowl, the system further comprising:
- (a) an agitator motor engaged with the agitator mechanism of the system and operable to cause mixing movement of the agitator mechanism upon activation of the agitator motor; the agitator mechanism including an upward extending rotor;
- (b) a horizontally extending rotary bar centrally joined with the rotary rotor, the rotary bar having diametrically opposed first and second ends;
- (c) first and second agitator rollers centrally and rotatably mounted by roller shafts on respective first and second bar ends to enable engagement of the rollers with the lower and outer surface of the bowl, each agitator roller having a roller axis extending radially outwardly from the agitator rotor and angled upwardly relative to the agitator rotor; the first and second rollers being spaced on the rotary bar so that both rollers push inwardly into the bowl during rotation so as to agitate and swirl the contents of the bowl;
- (c) an exhaust fan communicating with the container tub and operable to cause movement of air out of the container tub upon activation of the exhaust fan;
- (d) a timer coupled to the exhaust fan and the agitator motor and operable to cause activation of the exhaust fan for a selected delay interval before activation of the agitator motor upon activation of the timer; and
- (e) an operator switch coupled to the timer and operable to cause activation of the timer.

8. A system as set forth in claim 7 wherein:
- (a) a replaceable sanitary waste receiving liner bag is positioned within the system; and
- (b) activation of the exhaust fan causes the liner bag to closely contact internal surfaces within the system, including an upper surface of the bowl of the system.

9. A system as set forth in claim 7 wherein:
- (a) the timer is configured in such a manner that the delay interval is about 1 to 30 seconds.

10. A system as set forth in claim 7 wherein:
- (a) the timer is configured in such a manner that the exhaust fan and agitator motor continue to be activated for a selected run interval.

11. A system as set forth in claim 7 wherein:
- (a) the timer is configured in such a manner that the exhaust fan and agitator motor continue to be activated for a run interval of about 30 minutes.

\* \* \* \* \*